UNITED STATES PATENT OFFICE.

JAMES H. STEBBINS, JR., OF NEW YORK, N. Y.

FOOD COMPOUND.

SPECIFICATION forming part of Letters Patent No. 369,660, dated September 6, 1887.

Application filed November 16, 1886. Serial No. 219,067. (No specimens.)

*To all whom it may concern:*

Be it known that I, JAMES H. STEBBINS, Jr., a citizen of the United States, residing at New York, in the county and State of New York, have invented a new and useful Improvement in Food Compounds, of which the following is a specification.

The object of my invention is to produce a food compound which will furnish in a small bulk all the material necessary to support life and to preserve the physical system in a healthy condition. To accomplish this object it is necessary to combine the essential ingredients in the proper proportions, and also in an easily-digestible form, in order that the food may be entirely assimilated, and also that the stomach may not be compelled to deal with a mass of superfluous material in getting a certain amount of healthful nutriment. These results are very essential in a food intended for young children or invalids, or any class of people having weak digestive powers and who are in need of nutritious and strengthening food. It is also desirable in a food of this description that it should be in a form which can be easily and quickly prepared for consumption.

The substances most essential in a healthy nourishing food are nitrogen and carbon; but in all ordinary descriptions of food the amount of nitrogen is so small that it is necessary to consume a very large quantity of material in order to obtain the requisite proportion of nitrogen, and the greater part of this food is superfluous material, which it would be undesirable, both on account of quantity and constitution, for a delicate stomach to be burdened with. The other ingredients necessary in a perfect food besides nitrogen are carbon and a small amount of saline matter; but it is very much easier to obtain these in a desirable form and proper proportions than it is to procure the nitrogen. I have found, however, that the roe or eggs of fish may be used for the purpose of supplying nitrogen in a desirable form for food, and this roe I make the basis of my improved food, which is compounded and prepared as follows: To twenty parts, by weight, of the roe or eggs of fish are added thirty parts of cane-sugar and forty parts of oatmeal or other equivalent cereal, and the whole thoroughly mixed together. Water is now added, and the mixture is boiled for several hours, in order both to cook and to preserve it. When thoroughly cooked, the remaining water is evaporated off, and the compound is thoroughly desiccated. The hard dry mass thus obtained is now ground to a meal or flour, when it is ready to be packed for use.

In the above compound the sugar and the cereal furnish the requisite quantities of carbon, and a small portion is also supplied by the fish-roe. The cereal also adds some nitrogen and the necessary saline matter. The chemical analysis of this compound corresponds, essentially, with the composition of a perfect food as given by the most eminent physiological authorities.

To prepare my improved food for use all that is necessary is to mix the flour, prepared as above described, with a little water or milk, either warm or cold, to form a mush or gruel. No yeast or leaven of any description is used with this food, or in its original preparation.

Slight departures from the proportions above set forth will not materially affect the nature of my new food, and they are occasionally desirable to compensate for variations in the quality of different lots of the materials.

I am aware of British provisional specification No. 4,596, of 1880, and I make no claim to anything therein described.

What I claim, and desire to secure by Letters Patent, is—

A food compound consisting of a flour or meal composed of the roe or eggs of fish, oatmeal, and cane-sugar, in substantially the proportions set forth.

JAMES H. STEBBINS, JR.

Witnesses:
J. H. REED,
CHAS. B. POOR.